United States Patent
Turcanu et al.

(10) Patent No.: US 9,065,579 B2
(45) Date of Patent: Jun. 23, 2015

(54) GROUP SERVICE WITH INFORMATION ON GROUP MEMBERS

(75) Inventors: Calin Turcanu, Helsinki (FI); Jaakko Saijonmaa, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 998 days.

(21) Appl. No.: 10/732,539

(22) Filed: Dec. 11, 2003

(65) Prior Publication Data

US 2005/0054361 A1  Mar. 10, 2005

(30) Foreign Application Priority Data

Sep. 5, 2003  (FI) .................................. 20031268 U

(51) Int. Cl.
| | |
|---|---|
| H04W 4/00 | (2009.01) |
| H04H 60/80 | (2008.01) |
| H04W 4/08 | (2009.01) |
| H04W 8/18 | (2009.01) |
| H04L 29/06 | (2006.01) |
| H04W 12/06 | (2009.01) |

(52) U.S. Cl.
CPC ................ *H04H 60/80* (2013.01); *H04L 63/08* (2013.01); *H04L 63/104* (2013.01); *H04M 2203/2044* (2013.01); *H04W 4/08* (2013.01); *H04W 8/186* (2013.01); *H04W 12/06* (2013.01)

(58) Field of Classification Search
CPC ..... H04W 4/10; H04W 76/005; H04W 84/08; H04W 4/08; H04W 3/42093
USPC ......... 455/518, 410, 411, 415–419, 515, 445, 455/519, 520; 370/312, 260, 263, 266
See application file for complete search history.

(56) References Cited

U.S. PATENT DOCUMENTS

| | | | | |
|---|---|---|---|---|
| 6,253,091 | B1* | 6/2001 | Naddell et al. ................ | 455/519 |
| 6,477,150 | B1* | 11/2002 | Maggenti et al. ............ | 370/312 |
| 6,788,946 | B2* | 9/2004 | Winchell et al. .............. | 455/459 |
| 2002/0115453 | A1* | 8/2002 | Poulin et al. .................. | 455/456 |
| 2002/0141560 | A1 | 10/2002 | Khayatan et al. | |
| 2002/0143876 | A1* | 10/2002 | Boyer et al. .................. | 709/205 |
| 2003/0037103 | A1 | 2/2003 | Salmi et al. | |
| 2003/0083086 | A1 | 5/2003 | Toyryla et al. | |
| 2003/0096621 | A1 | 5/2003 | Jana et al. | |

(Continued)

FOREIGN PATENT DOCUMENTS

WO  WO 03/065701  8/2003

OTHER PUBLICATIONS

Chinese Office action for corresponding CN application No. 200480025415.9 dated Jan. 14, 2011, pp. 1-15.

(Continued)

*Primary Examiner* — Tu X Nguyen
(74) *Attorney, Agent, or Firm* — Ditthavong & Steiner, P.C.

(57) ABSTRACT

Group communication service is becoming more and more popular in communications systems. The users of the group communication would benefit especially from summarized group information. A member of a group comprising at least two members can receive the summarized group information by subscribing to information on other group members; wherein information on the group is summarized at least on the basis of current information on at least one other group member whose information was subscribed to; and by showing the thus obtained summarized group member information to the member.

14 Claims, 7 Drawing Sheets

(56) References Cited

U.S. PATENT DOCUMENTS

| | | | |
|---|---|---|---|
| 2003/0097404 A1 | 5/2003 | Sakakibara et al. | |
| 2003/0100326 A1* | 5/2003 | Grube et al. | 455/515 |
| 2003/0119540 A1 | 6/2003 | Mathis | |
| 2003/0222819 A1* | 12/2003 | Karr et al. | 342/457 |

OTHER PUBLICATIONS

Chinese Office Action for Chinese Patent Application No. 2011101448149 dated Feb. 22, 2012, pp. 1-3.

Office Action of Corresponding European Application No. 04 767 028.6-2416 dated Jun. 11, 2010. pp. 1-4.

Office Action of Corresponding European Applications No. 04 767 028.6-2416 dated Jan. 11, 2010. pp. 1-5.

Office Action for related Chinese Patent Application No. 200480025415.9 dated Feb. 6, 2009, pp. 1-13.

Office Action for related Chinese Patent Application No. 200480025415.9 dated Nov. 23, 2007, pp. 1-26.

Office Action for related Chinese Patent Application No. 200480025415.9 dated Oct. 29, 2012, pp. 1-5.

Office Action for related Chinese Patent Application No. 200480025419.9 dated Sep. 5, 2008, pp. 1-15.

\* cited by examiner

GROUP SERVICE WITH INFORMATION ON GROUP MEMBERS

BACKGROUND OF THE INVENTION

1. Field of the Invention

The present invention relates to group communication in communications systems providing group service.

2. Description of the Related Art

One special feature offered in mobile communications systems is group communication. The term "group", as used herein, refers to any logical group of two or more users intended to participate in the same group communication. One example of group communication is a group call, which is a call in which all participants may take turns to speak and to listen to each other. The same user may be a member in more than one group. Typically, the members of the group belong to the same organization, such as the police, the fire brigade, a private company, etc. Also, typically, the same organization has several separate groups, i.e. sets of groups. Even private persons might want to have talk groups, such as hobby groups, sport groups, etc.

A group communication may be used, for example, by small business users for a more frequent job-related communication during a working day within the same work group, either inside the company or within some business community. They would benefit from information on other group members, such as presence information, and especially summarized information on group members. For example, information on how many group members are logged into a group may be useful when a user has to decide whether to make a group call or "individual" call/calls. If only one other member is reachable via the group, it is probably more convenient to make an individual call instead of a group call. However, there is no summarized information on other group members available for the time being and no mechanism to provide such information exists in systems providing group communication.

One possible solution is to connect the communications system providing group communication to a presence server and change the groups into groups provided by presence service as described in the Wireless Village (WV) initiative. Presence information means information related to the user's identity, attributes and ability/willingness to communicate at a particular moment. Examples of presence service are disclosed e.g. in version 1.1 specifications for presence attributes, features and functions and system architecture model of the Wireless Village initiative or provided by wireless AOL® Instant Messenger™ (AIM) service or Enterprise AIM® service. The Wireless Village initiative is a program of the IEEE Industry Standards and Technology Organization (IEEE-ISTO), and has now joined the OMA (Open Mobile Alliance) where presence service specifications are defined in an IMPS working group.

However, these WV groups are chat groups using only messaging services, not providing essential group communication features, such as speech calls, traffic discipline, group prioritizing, etc. Furthermore, not even the presence service provides summarized group member information. For example, the number of chat group members has to be calculated manually.

SUMMARY OF THE INVENTION

An object of the present invention is to provide a method and an apparatus for implementing the method so as to provide summarized group member information. The objects of the invention are achieved by a method, a device and a communications system which are characterized by what is stated in the independent claims. The preferred embodiments of the invention are disclosed in the dependent claims.

The invention is based on realizing the problems disclosed above and solving them by summarizing information on the group on the basis of current information on group members. Thus, the summarized group member information exists and is available for individual group members. For example, when a group member selects the group, summarized information on individual group members can be shown to the member.

An advantage of the invention is that summarized group member information can be provided to group members without sacrificing any group communication features nor restricting the group communication to one particular information type.

BRIEF DESCRIPTION OF THE DRAWINGS

In the following the invention will be described in greater detail by means of preferred embodiments with reference to the attached drawings, in which.

DETAILED DESCRIPTION OF THE PREFERRED EMBODIMENTS

The present invention is applicable to any communications system providing group communication. The communication may include data calls, audio calls, video calls, multimedia calls, group messaging, short messaging, electronic mail, etc.

Conventionally group communication has been available only in trunked mobile communications systems, such as Professional Mobile Radio or Private Mobile Radio (PMR) systems, such as TETRA (Terrestrial Trunked Radio), which are special radio systems primarily intended for professional and governmental users. However, the group communication is now becoming available also in public mobile communications systems because it opens up more versatile possibilities than a conference call. New packet-based group voice and data services are being developed for cellular networks, especially in the GSM/GPRS/UMTS network evolution. In some approaches, the group communication service, and also a one-to-one communication, are provided as a packet-based user or application level service so that the underlying communications system only provides the basic connections (i.e. IP connections) between the group communications applications in devices, such as the user terminals, and the group communication service.

In the following, embodiments of the invention will be described as implemented in mobile packet radio communications systems, such as the GPRS (General Packet Radio Service) or the UMTS (Universal Mobile Telecommunications System), and utilizing the presence service as an example of an information service providing information on users without limiting the invention to these communications systems and presence services.

Figure 1:
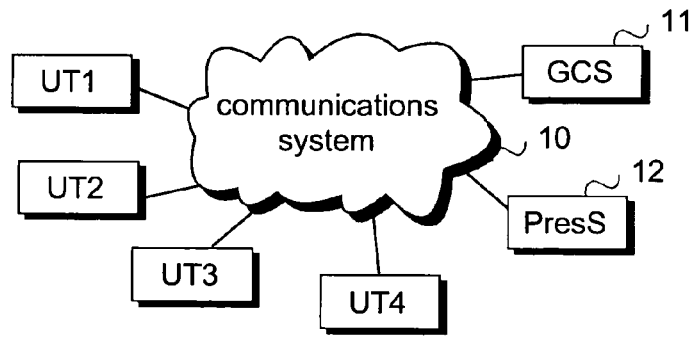
FIG. 1 illustrates an example of general architecture of a communications system providing group communication service and presence service.

The implementation of the devices and the system entities providing the group communication service with the information service, such as servers and/or server components in a network, may vary according to the specific communications system which the present invention is applied to and according to the embodiment used. The general architecture of a communications system having a group communication service (GCS) functionality with a presence information service functionality is illustrated in FIG. 1.

The group communication service (GCS) functionality may be integrated into the switching and connection set-up or call control functionalities of the communications system 10, for example in a manner group calls are implemented in the conventional trunked radio or PMR systems, such as the TETRA. Alternatively, the group communication service (GCS) functionality may be a user or application level service so that the underlying communications system only provides the basic connections (i.e. IP connections) between the applications in the user terminals UT1-UT4 and the group communication service (GCS) functionality. In the latter approach, the group communication service (GCS) may be provided by a group communication server while the client applications reside in the user terminals (UT). The group communication service may also be implemented as a combination of these two approaches.

The presence service (PresS) functionality may be provided in the infrastructure side by a presence server while the presence client applications reside in the user terminals. The presence service (PresS) functionality may be integrated into the group communication service (GCS) functionality. Typically, the presence service may be regarded as a home environment service or a home environment value added service provider service, wherein the home environment manages the presence information of users' devices, services and service media, even when roaming. The presence information is a set of attributes characterizing current properties of presence information providers, such as status or an optional communication address.

As disclosed earlier, the presence service functionality is only an exemplary functionality illustrating herein all possible service functionalities providing information on group members. Another example is a service providing location information.

Figure 2:
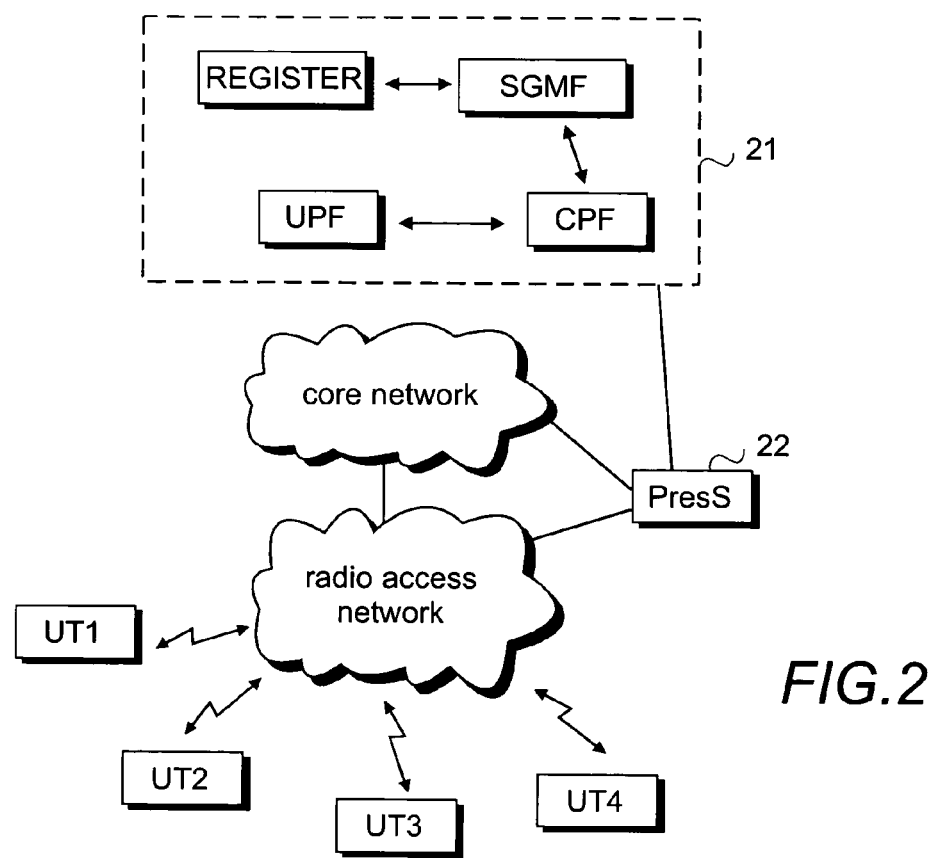
FIG. 2 illustrates an embodiment wherein a packet mode group communication service is provided with a server system overlying the cellular core and radio access networks.

FIG. 2 illustrates an example wherein a packet mode group communication service with presence information is embodied with a server-based group communications system 21 having different control-plane and user-plane logical entities serving the subscribers. The basics of this concept and examples of the architecture and different implementations are illustrated in more detail in the co-pending U.S. patent application Ser. Nos. 09/835,867; 09/903,871; 10/160,272; and 10/173,558; and in the PCT application WO 02/085051, which are incorporated herein by reference. When this approach is employed for the push-to-talk communication, the concept is also referred to as a push-to-talk over cellular (PoC) system.

The subscriber transmissions are proxied and forwarded by these server entities, which do not allow direct end-to-end transmissions between the subscribers. It should be appreciated that control-plane functions (CPF) and user-plane functions may also be within the underlying communications network(s), providing a top protocol layer for the communications network. The underlying mobile communications system may be, for example, the second generation (2G) packet radio system, such as GSM/GPRS, providing the IP packet data service. Particularly in the third generation (3G) mobile system, the public land mobile network (PLMN) infrastructure may be logically divided into core network (CN) and access network (AN) infrastructures. The radio access network may be based on a second generation (2G), third generation (3G) or any other radio access technology. The radio access network RAN is called a base station subsystem (BSS) for the GSM, and a radio network subsystem (RNS) or radio access network (RAN) for the UMTS. Similarly, any communications system supporting a packet mode communication can be employed instead of the mobile network infrastructure described above. It should be appreciated that the type of the underlying network layer (i.e. "the communications system") is not essential to the basic invention.

In FIG. 2, a packet-based group communications system 21 is provided on top of the mobile network in order to provide group communication services to the user equipment or terminals UT through the communications system. The group communications system 21 may be embodied as a server system. Conceptually, the group communication server system may comprise control-plane functions CPF and user-plane functions providing packet mode server applications, which communicate with the group communication client application(s) in the user terminals UT over the IP connections provided by the communications system. This communication includes signaling packets and voice or data communication packets. The CPF function is responsible for control-plane management of the group communication. This may include, for example, managing the user activity and creation and deletion of logical user-plane connections with an appropriate control protocol, such as session initiation protocol SIP. The user may also perform group attachment and group detachment with the CPF using control signaling, e.g. the SIP protocol. The CPF also carries out user registration and authentication. It is preferably the CPF that exchanges information with a presence server 22.

The user-plane function (s) UPF is responsible for distribution of the data or speech packets to the user terminals according to their group memberships and other settings. The UPF forwards traffic only between valid connections programmed by the CPF. In the case of speech communication, it may be based on the voice-over-IP (VoIP) protocol, and/or real-time transport protocol (RTP). It should be appreciated that the user plane operation relating to the data or speech traffic is not relevant to the present invention. However, the basic operation typically includes routing all the data or speech packet traffic from a sending user to the UPF, which then delivers the packet traffic to all receiving users in the group using a suitable technique, such as multicasting or multiple unicasting (multi-unicast).

The group communication server system 21 may also include a subscriber and group management function (SGMF) for managing the subscriber and group data. It may also provide specific tools and interfaces needed for subscriber and group provisioning. Such tools or interfaces may include a WWW-based control interface accessible using a standard web browser. The SGMF may also have a database for storing the user and group information. The SGMF provides the information to the CPF when needed, for example during a group attachment. The system 21 may also include a register for storing all provisioned data in the group communications system.

The presence server 22 is a server providing presence service functionality. The presence server fetches presence information, service capability information and/or location information from different external and internal sources, such as the core network providing communication services to the user or from the group communications system 21 using, for example, SMCNP (Server to Mobile Core Network Protocol) with the core network and SSP (Server to Server Protocol) with the group communications system. The presence server 22 can also be used for authentication and authorization of users, i.e. user equipment or terminals, clients and servers. The presence server 22 may also obtain location information from location services. For example, the GPRS core network contains a standard circuit-core-based location service having the serving mobile location centre (SMLC) and the gateway mobile location centre (GMLC) entities. Thus, the presence server 22 may obtain the location of the users via the GMLC, for example. Another possibility is to fetch the location information from the group communications system 21. The location information can be directly pushed to the presence server 22 and/or to the group communications system 21 from time to time by the location service, or the presence server 22 can fetch the location from the location service. The fetching can be performed from time to time or when the location information is actually needed. If the mobile communications network cannot provide the location information, as might be the case with a TETRA system, other location information technologies can be utilized, such as the GPS (global positioning system).

Figure 3:
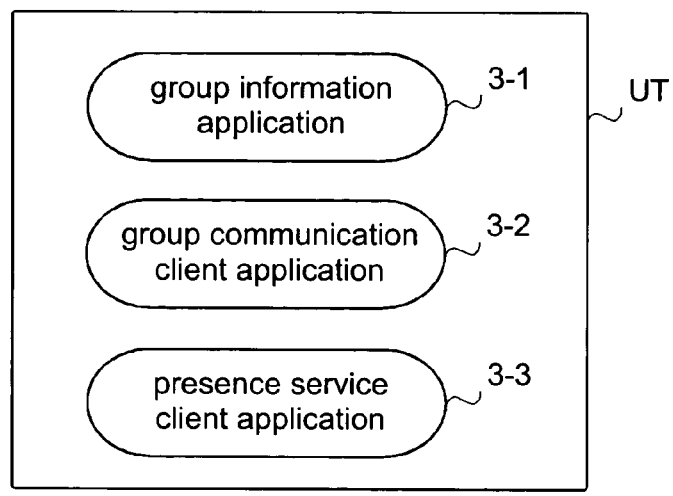
FIG. 3 is a generic functional block diagram for a device according to an exemplary embodiment of the invention.

FIG. 3 illustrates a generic functional block diagram for a device UT according to an exemplary embodiment of the invention. The device also includes means and functionalities which are not shown in FIG. 3 and which are apparent for one skilled in the art, such as user interface(s), operating functionalities, processor(s) for executing applications and programs, etc. The device can be a wireless device, such as mobile user equipment, or it can be a device connected by a fixed connection, such as a dispatcher station. Herein the term user terminal and corresponding acronym UT is used for referring to any device or user equipment allowing the user to access network services. In the PoC, the user terminal typically comprises subscriber identification information, for instance a detachably connectable identification unit, and the actual terminal equipment, identifiable, if needed, on the basis of the identifier of the terminal equipment, for example. In the PoC, the user terminal also covers dispatcher stations to which a user can log with his own identity.

Figure 4:
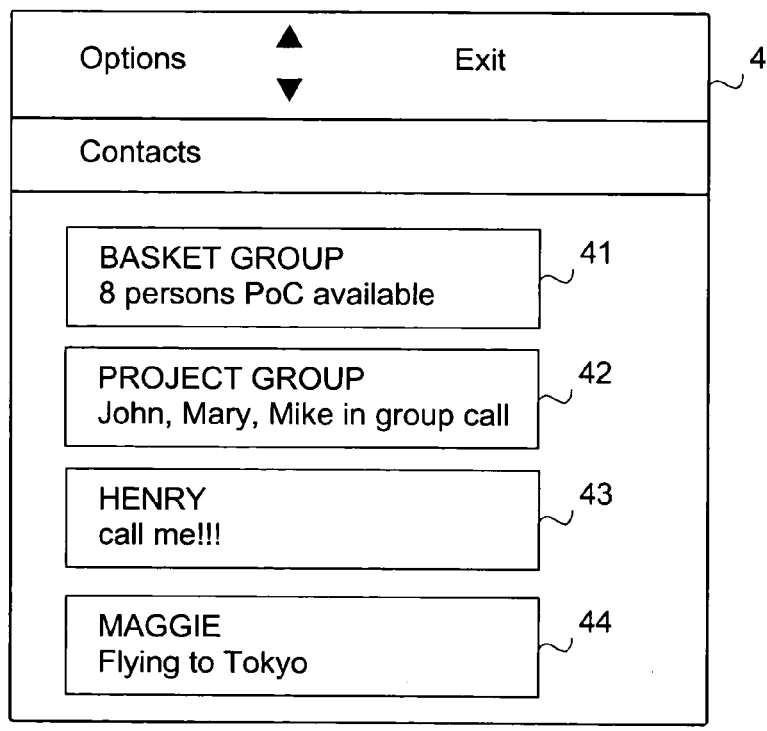
FIG. 4 illustrates a screen view providing summarized group member information.

The device UT according to an exemplary embodiment of the invention comprises a group information application 3-1, a group communication client application 3-2 and a presence service client application 3-3. These applications may be at least partly integrated, forming a mechanism which can be called a group-enhanced phonebook, an example of which is illustrated in FIG. 4. The UT may also comprise a separate phone book application, which may be integrated with the group information application 3-1 and/or embodied by the group-enhanced phonebook. The phone book application is typically for managing and maintaining contact information on individuals.

The group information application 3-1 provides the user of the terminal with summarized group member information on the basis of group-related information retrieved from the group communication application 3-2 and on the basis of the presence information retrieved from the presence service client application. In other words, it provides the user with a tool for maintaining and managing contact information on groups, preferably either separately or with the phone book application. The group information application 3-1 interacts with the user via a user interface (not shown), i.e. the group information application 3-1 generates various views on the display (not shown) and receives user inputs via a keyboard or other input means (not shown). Examples of summarized group member information are shown in FIG. 4. In some embodiments of the invention, the user of the UT may define, preferably group-specifically, what he wants to see as the summarized group member information. In some other embodiments, the definition is part of the group information.

The group communication client application 3-2 provides the group communication service. The group communication client application 3-2 maintains group information, such as group identification information and group membership information. The group communication client 3-2 provides tools for group creation, for attaching (joining) to a group and for detaching from (leaving) the group, etc.

The presence service client application 3-3 is an example of information service application possibly needed in the device for the service. The presence service client is preferably arranged to update presence information of the UT to the presence server in response to changes in presence information without any request by the user of the UT. For example, the presence information is updated in response to location update, selecting silent/loud mode, activating/deactivating a group, connecting/removing head-set etc. Examples of presence information are group members' location, group members' availability (available, busy, etc), group members' terminal status (in a call, data services on, in a group call, idle, etc). The presence server client application 3-3 is also arranged to receive presence information on other users on the basis of what the user of the UT has subscribed to.

FIG. 4 shows an example of a screen view 4 according to the invention. The screen view is a user interface 4 view of group-enhanced phonebook keeping track of contacts stored in the group-enhanced phonebook, the contacts being either group contacts 41, 42 or individual contacts 43, 44. The group contacts illustrated in FIG. 4 are a Basket group 41 and a Project group 42. The summarized group member information on the Basket group has been defined to be the number of available persons. In the example illustrated in FIG. 4, there are 8 persons PoC available for the Basket group. In other words, 8 persons may be reached by utilizing PoC group communication. The summarized group member information on the Project group shows names of the group members who are in a group call. The summarized group member information on the Project group may have been defined to be a listing of the names of the members who are participating in a group call, and if there is no group call going on, a listing of the names available for the group call and if no one is available for the group call, informing how many persons belong to the group. Yet another example of summarized group member information is a map or a layout showing locations of group members and using different colors for group members who are active and who are not. These examples do not limit the content of the summarized group member information and it should be understood that the summarized group member information maybe anything that is defined to be important information.

The summarized group member information may have more than one level. The uppermost level could be what is shown as a card view illustrated in FIG. 4, and the second level could be shown after the group has been selected. The second level may show a more detailed summary of the group member information or information member-specifically. Beyond the second level there can be more levels.

The summarized group member information may be based on information on a subset of group members, the subset being selected by the user of the device or based on some criteria, such as those belonging to the same organization or those on whom the information is subscribed to. The criteria may be the same for all groups or may be defined group-specifically. The criteria may be part of a group definition. It is also possible that subsets are selected level-specifically, i.e. different levels have different subsets. For example, the first level may show those active members the user is interested in, and the second level the total amount of members. Other examples are described with FIG. 5.

In the following the invention is described in more detail with different exemplary embodiments using three exemplary groups: Group A having members UT1, UT2 and UT3, group B having members UT1, UT2 and UT4 and group C having members UT1, UT2 and UT5. In all exemplary embodiments, it is assumed that all users are able to subscribe to presence information, able to authorize others to subscribe to his/her presence information, allowed to join the groups and an URL (uniform resource locator) address, later URL, is used as identification information for both the members of the group and for the group itself. The examples are disclosed in view of the UT1, i.e. the inventive functionality is described only with the UT1, although the other terminals may also comprise the inventive functionality. The details on how a group is formed and group information stored are not described in detail here, since they bear no significance to the invention and one skilled in the art is familiar with the details.

First Exemplary Embodiment

In the first exemplary embodiment of the invention, it is assumed that the presence server has no information on a group. Thus, no amendments are required to the presence server PresS and to the GCS and the group presence information is subscribed to from the presence server as individual presence information. In other words, it is assumed that the GCS and the PresS are independent and the group members are individual users for the presence server.

The first exemplary embodiment of the invention may be applied to predefined groups and ad hoc groups. Predefined groups are rather static groups with predefined member lists formed by a user of the group communication service or a system administrator whereas ad hoc groups are typically created spontaneously for temporary use by a user who invites other members to join the group. In other words, ad hoc group refers here to any group whose members are invited to join the group. Group information on predefined groups and ad hoc groups is maintained in the GCS. The ad hoc groups differ from the predefined groups in that the GCS maintains information on an ad hoc group members typically only when there is at least one member logged into the group and information is maintained only on members logged into the group, i.e. before attaching and after detaching no information is maintained, whereas information on members of a predefined group is maintained regardless of whether or not a member is attached or detached.

Figure 5:
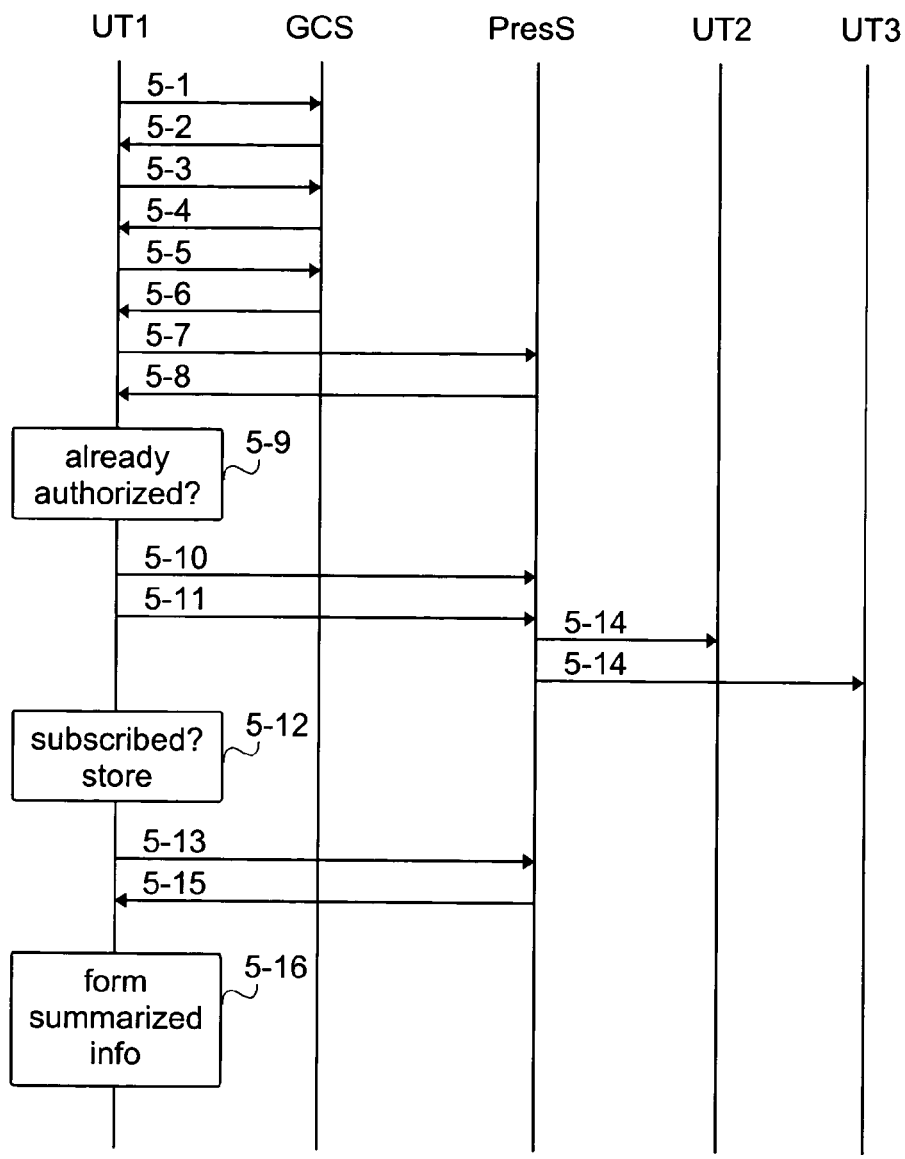
FIGS. 5 to 12 are signaling diagrams illustrating examples of different group communications procedures that may be carried out in various embodiments of the invention.

FIG. 5 starts at the moment when the UT1 wants to start to use group communication service. Therefore the UT 1 sends message 5-1 to the GCS in order to authenticate itself to the PoC server GCS. The authentication succeeds and the GCS acknowledges the authentication by sending message 5-2. Then the UT1 wants to join (attach itself to) group A and sends message 5-3 to the GCS, message 5-3 containing the URL of group A. The GCS acknowledges that the UT1 has joined group A by sending message 5-4. The UT1 is now active in group A.

In response to receiving message 5-4, the UT1 requests the member list of group A from the GCS by sending message 5-5. In this exemplary embodiment of the invention, the GCS is arranged, in response to the request, to filter information from the member list on the member who requested for the member list, i.e. the member list sent in response to the request does not comprise information on the member who asked for the member list. The content of the member list depends, among other things, on the group type. Thus, the member list may contain identification information on those members who have joined the group, i.e. are active, or identification information on all group members regardless of whether or not they have joined the group. After forming the member list of group A, the GCS sends the member list to the UT1 in message 5-6. In this exemplary embodiment of the invention, the member list comprises URLs of UT2 and UT3.

In this example it is assumed that the UT1 has not yet authenticated itself with the presence server. Therefore the UT1 then authenticates itself to the PresS by sending message 5-7. The authentication succeeds and an acknowledgement is sent in message 5-8 from the PresS to the UT1.

In order to obtain summarized group information, the UT1 according to this exemplary embodiment of the invention is configured to first authorize its presence information to the other members of the group by sending message 5-10 to the PresS. The UT1 knows the other members on the basis of the information it received in message 5-6. Before sending message 5-10, the UT1 according to this embodiment of the invention checks member-specifically, in point 5-9, whether it has already authorized its presence information to the member in question. By performing this checking, the UT1 authorizes only those members of the group who have not been previously authorized. However, in some other embodiments of the invention this checking may be skipped and individual members may be authorized several times. Message 5-10, i.e. an authorization message, comprises URLs of other members of the group who are not yet authorized to receive the presence information of UT1.

Message 5-10 also contains PoC presence attributes either member-specifically (e.g. given as many times as there are URLs) or group-specifically (e.g. given only once). Thus, UT1 is able to hide certain presence attribute values so that other group members subscribing group presence information do not see those hidden attribute values. When the values are given member-specifically, the presence information shown to one member of the group may be different from the presence information shown to another member of the group; it is even possible that no presence information is shown to some member(s) of the group. In other words, the presence owner can authorize how widely his presence information is delivered to other group members—even member-specifically.

The PoC presence attributes may comprise PoC presence default (client) attributes, optional presence attributes (user attributes) and default PoC presence authorization attributes. The PoC presence default attributes may indicate, whether the UT1 is an active group member (group URL), whether the UT1 is in phone call (busy), whether the UT1 is speaking in group A (group URL), whether the loudspeakers are on or off, whether the headset is on or off or whether the UT1 is in silent mode. The optional presence attributes may indicate the location of the UT1 or the way how to contact it, give some advice to group members or indicate the activity of the user of the UT1. Examples of an activity are "on duty", "on meeting", "free", "on holiday" and "do not disturb". The default PoC presence authorization attribute may be one of the following: all (no limitations), all PoC group members, group members of a certain organization, group members in its own phonebook (i.e. group members who are also as individuals in UT1's phonebook) or the latest active group only. With the value of the default PoC presence authorization attribute, the user of the UT1 defines who can see his presence information, i.e. to whom his presence information is delivered. Thus, the presence owner may divide group members into different kinds of subgroups, for instance, to those who obtain all presence information, those who obtain only part of the presence information and/or to those who do not obtain any presence information. For example, employees of company AZ and employees of company BX may belong to the same group, but an employee of company AZ may prevent the employees of company BX from obtaining his presence information. Thus, the authorization mechanisms from the presence fetching/updating point of view may be performed based on the fact that each user has his own list management (for instance, private list, public list, block list), so depending on the list, the members of that list will have different rights regarding presence information."

After sending message 5-10, the UT1 pushes its new presence information, i.e. the current value of the PoC presence attributes, such as the information that the UT1 is now an active member of group B, to the PresS in message 5-11.

In response to receiving presence information on the UT1 in message 5-11, the PresS pushes the presence information on the UT1 in messages 5-14 to the UT2 and the UT3, i.e. to those devices whose URLs where in message 5-10. Naturally, message 5-14 is not sent to a device which has not subscribed to the presence information of the UT1.

After sending message 5-11, the UT1 checks member-specifically, in point 5-12, whether it has already subscribed presence information on the member in question, subscribes to the PoC presence information by sending message 5-13 to the PresS and stores, in point 5-12, information on members whose presence information was subscribed to in message 5-13. Message 5-13, i.e. a subscription message, contains information on a PoC presence subscription type and URLs of those members who fulfill the conditions laid down in a PoC presence subscription and whose presence information the UT1 has not yet been subscribed to. In this example message 5-13 contains the URLs of the UT2 and the UT3.

The PoC presence subscription type is preferably either "automatic", i.e. presence information is pushed to the UT, or "on request", i.e. the UT requests presence information from time to time or in response to a certain event, for example. In this example it is assumed that the subscription type is automatic.

The PoC presence subscription of a user defines the presence information subscribed to on group members of all groups where the user is a member (active or passive), on group members of all groups where the user is an active member, on group members of a certain organization, on group members in the user's own phonebook or on group members of the user's latest active group only or on group members selected by the user. With the PoC presence subscription the user can limit the amount of subscribed presence information. For example, instead of subscribing to presence information on all 1000 members belonging to the group, he can subscribe to presence information on 3 members he is interested in.

In response to message 5-13, in message 5-15 the PresS delivers presence information on those URLs which were in message 5-13, necessitating that they have authorized the UT1 to receive their presence information. If the UT2 and/or the UT3 authorizes the UT1 to obtain the presence information after this subscription, the PresS will push the presence information to the UT1 after the authorization.

Then the UT1 forms, in point 5-16, the summarized group member information on the group A on the basis of the received and earlier received presence information on other group members. Depending on the summarized information type, the UT1 may not or may use its own presence information. In other words, in this example, group A is added to the group-enhanced phonebook with summarized group member information. For example, the summarized group member information could indicate that the UT2 and the UT3 are reachable via group A and that the number of group members is 3. This summarized group information is then delivered, when requested, to the user via the user interface.

Figure 6:
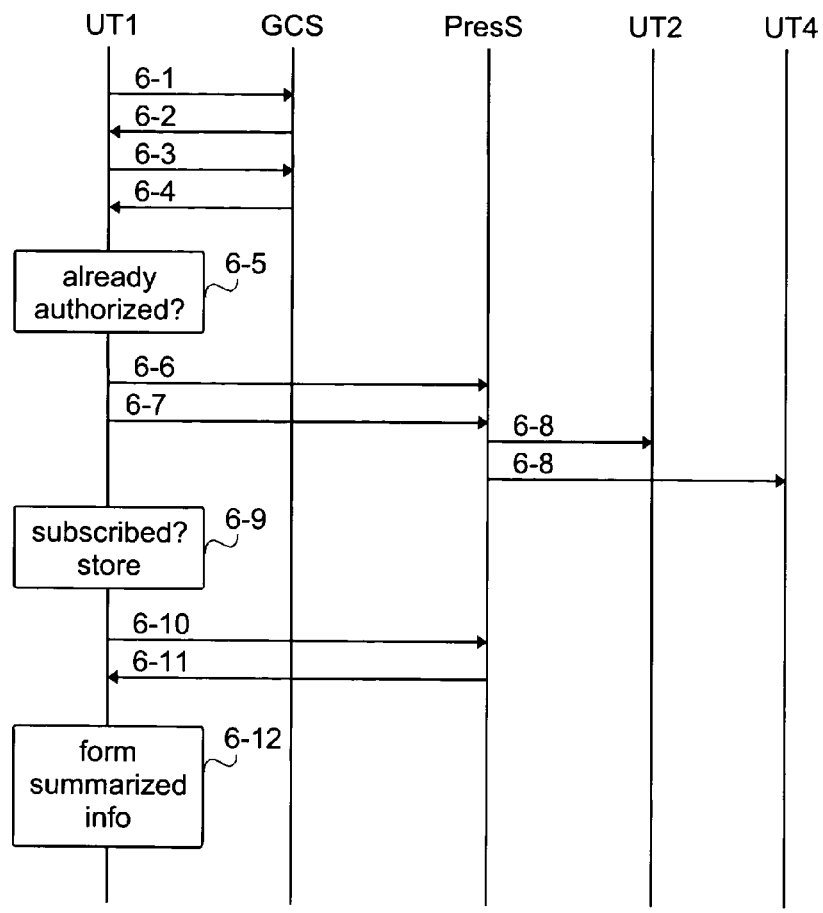

FIG. 6 is a signaling chart illustrating the situation after FIG. 5 when the UT1 wants to join group B and obtain summarized group member information on group B. Therefore the UT1 sends message 6-1 indicating the joining to the group and receives acknowledgement in message 6-2, requests for a member list in message 6-3 and receives the member list in message 6-4, messages corresponding to messages 5-3 to 5-6, respectively, described above in FIG. 5. Then the UT1 according to this embodiment of the invention checks member-specifically, in point 6-5 (corresponding to point 5-9 in FIG. 5), whether it has already authorized its presence information to the member in question. This time the UT1 finds out that it has already authorized the UT2, but not the UT4. Therefore, message 6-6 (corresponding to message 5-10 in FIG. 5) from the UT to the PresS contains the URL of the UT4 and the presence attributes.

The presence attributes of group B may be different and/or have different values from those of group A and, thus, information on UT1 delivered to members of group A may be different from the presence information on UT1 delivered to members of group B. If the presence attributes are given group-specifically, i.e. so that they are different for different groups, the first authorization for a single member is the one that is valid in this exemplary embodiment of the invention. In other words, the UT2 obtains the presence information on the UT1 according to authorization given for group A unless the UT1 first unauthorizes the UT2, and then authorizes it for group B with new attributes.

After sending message 6-6, the UT1 pushes its current presence information to the PresS in message 6-7. In response to the authorization and updated presence information, the PresS pushes the presence information on the UT1 in messages 6-8 to the UT2 and the UT4, necessitating they have subscribed to it.

Then the UT1 checks member-specifically, in point 6-9 (corresponding to point 5-12 in FIG. 5), whether it has already subscribed to presence information on the member in question, subscribes to the PoC presence information by sending message 6-10 (corresponding to message 5-13 in FIG. 5) and stores information on members whose presence information was subscribed to in message 6-10. This time the UT1 finds out that it has already subscribed to the presence information on the UT2, but not that on the UT4. Therefore, the UT1 subscribes to the presence information on the UT4 in message 6-10.

In response to message 6-10, in message 6-11 the PresS delivers presence information on those URLs which were in message 6-10, necessitating that they have authorized the UT1 to receive their presence information. If the UT4 authorizes the UT1 to obtain the presence information on the UT4 after this subscription, the PresS will push the presence information on the UT4 to the UT1 after the authorization.

Then the UT1 forms, in point 6-12, the summarized group member information on the group B on the basis of the received and earlier received presence information on other group members. In other words, in this example, group B is added to the group-enhanced phonebook with summarized group member information. For example, the summarized group member information could indicate members of group B. In other words, in this example, group B is added to the group-enhanced phonebook indicating that other members of the group are the UT2 and the UT4, for example.

If the PoC presence subscription (explained with message 5-13 in FIG. 5) was the "latest active group only", the UT1 checks which members of group A are not in group B, and unsubscribes to the presence information of such members by sending a message to the PresS, the message indicating such group members. Then the UT1 unauthorizes its presence information for such members by sending a message to the PresS, the message indicating such group members. In response to the latter message, the PresS could notify those group members. In the above example, the UT1 would unsubscribe to presence information on the UT3 and unauthorize the UT3 to receive presence information on the UT1 or part of the presence information on the UT1. In other words, the UT1 can forbid a delivery of all presence information on the UT1 to the UT3 or limit the delivery to certain attributes, such as availability. This signaling is not, however, shown in FIG. 6.

In some other embodiments, based on the first exemplary embodiment of the invention, the UT1 may skip the checking of whether it has already authorized another user to receive presence information, checking of whether it has already subscribed to another user's presence information and/or checking whether it has already pushed its' current presence information to the PresS and perform the authorization, subscription and/or pushing every time the UT1 joins a group. In some of these embodiments, the UT1 first unauthorizes all existing presence authorizations and then authorizes the new group.

For ad hoc groups, the UT of the present invention may be arranged to periodically request for a member list of the group from the GCS. The GCS may be configured, either alternatively or also, to send information on new members to the former members of the group periodically or in response to a member joining the group or periodically if someone has joined the group, for example. The information corresponds to message 6-4, for example, and in response to receiving the information, the UT preferably repeats points 6-5, 6-8 and 6-11 and performs the necessary signaling.

Figure 7:
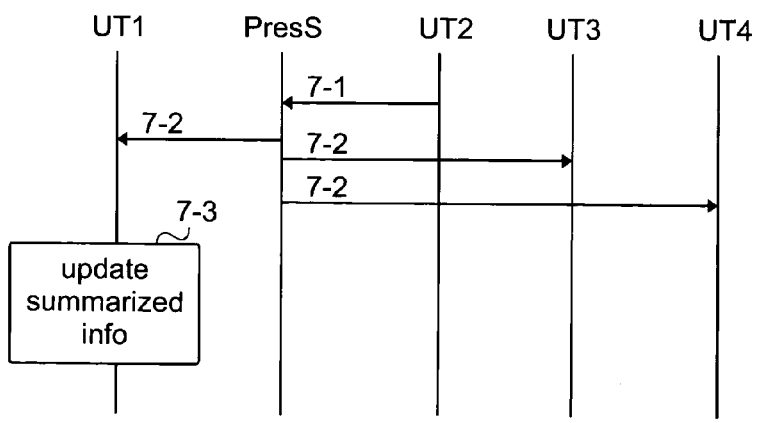

FIG. 7 is a signaling chart illustrating a situation when the presence information on the UT2 changes. In response to the change, the UT2 sends message 7-1 to the PresS, message 7-1 containing the changed presence information on the UT2. In FIG. 7 it is assumed that the UT1, the UT3 and the UT4 have subscribed to the presence information on the UT2 to be delivered to them automatically, i.e. whenever the presence information changes, it is pushed to them. Therefore, the PresS pushes in messages 7-2 the current presence information on the UT2 to the UT3, the UT4 and the UT1.

In response to receiving message 7-2, the UT1 updates, in point 7-3, the presence information on the UT2, and the summarized group member information on those groups whose member the UT2 is. If the signaling of FIG. 7 takes place after FIG. 6, then UT1 updates the summarized group information on groups A and B to correspond to the current presence information on the group members, provided that the PoC presence subscription is not "the latest active group only". For example, if the UT2 logged out of the system, the summarized group information on group A can be after the update that the UT 3 is reachable, but the UT2 is non-reachable via group A, and the group member information on group B can be updated to indicate that there is only one other member in group B, namely the UT4. Another example is that the UT2 has been speaking in group B, but stops talking (e.g. by releasing his pressel PTT, pushed to talk). Then the summarized group member information on group A does not change, but the summarized group member information on group B may change, if the summarized group member information on group B indicates the active caller.

Figure 8:
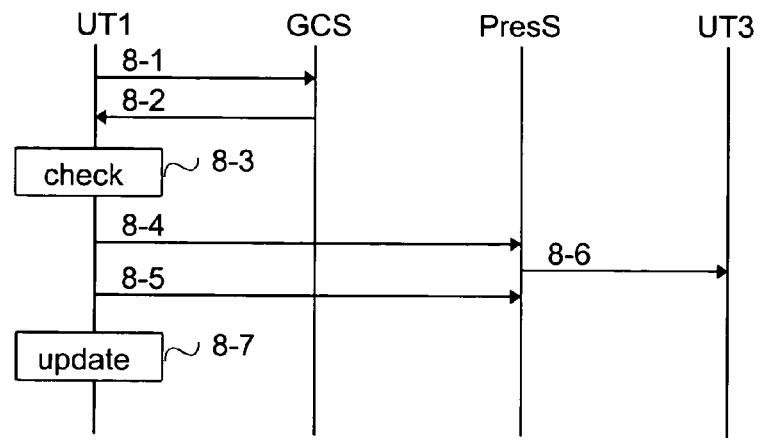

FIG. 8 illustrates signaling in a situation when the UT1 is attached to groups A and B and wants to detach itself from (leave) group A. Therefore, the UT1 sends message 8-1 to the GCS, the message indicating that the UT1 leaves group A. The GCS updates its information and sends an acknowledgement to the UT1 in message 8-2. Then the UT1 checks, in point 8-3, whether there are any members in group A who are not in the individual list or members of any other group. In this example such a member is the UT3. Therefore the UT1 unauthorizes its presence information from the UT3 by sending message 8-4 to the PresS and unsubscribes to the presence information on the UT3 by sending message 8-5 to the PresS. Then the UT1 updates, in point 8-7, its summarized group information on group A either by deleting group A from the group-enhanced phone book or by updating the summarized group information on group A to show that the UT1 is not attached to the group, for example. The UT1 also deletes the presence information on those members whose presence information it unsubscribed to in message 8-5, i.e. in this example the presence information on the UT3.

In response to message 8-4, the PresS sends message 8-6 to the UT3. Message 8-6 informs the UT3 that the presence information on the UT1 is to be "nulled". If group A is a predefined group, the UT3 may still show some information, such as "inactive" or "no info available", or calculate the UT1 to the members of group A. If group A is an ad hoc group, the UT3 updates the group information by deleting information relating to the UT1 in response to message 8-4 and/or in response to receiving a new member list from the GCS.

Second Exemplary Embodiment

In the second exemplary embodiment of the invention, it is assumed that the presence server has information on a group, and that the GCS and the PresS are connected to each other. The second exemplary embodiment of the invention may be applied to predefined groups and to ad hoc groups described with the first exemplary embodiment of the invention. The second exemplary embodiment of the invention limits the groups so that those members on whose presence information the summarized group member information is based have to be users of the group communication service.

Figure 9:
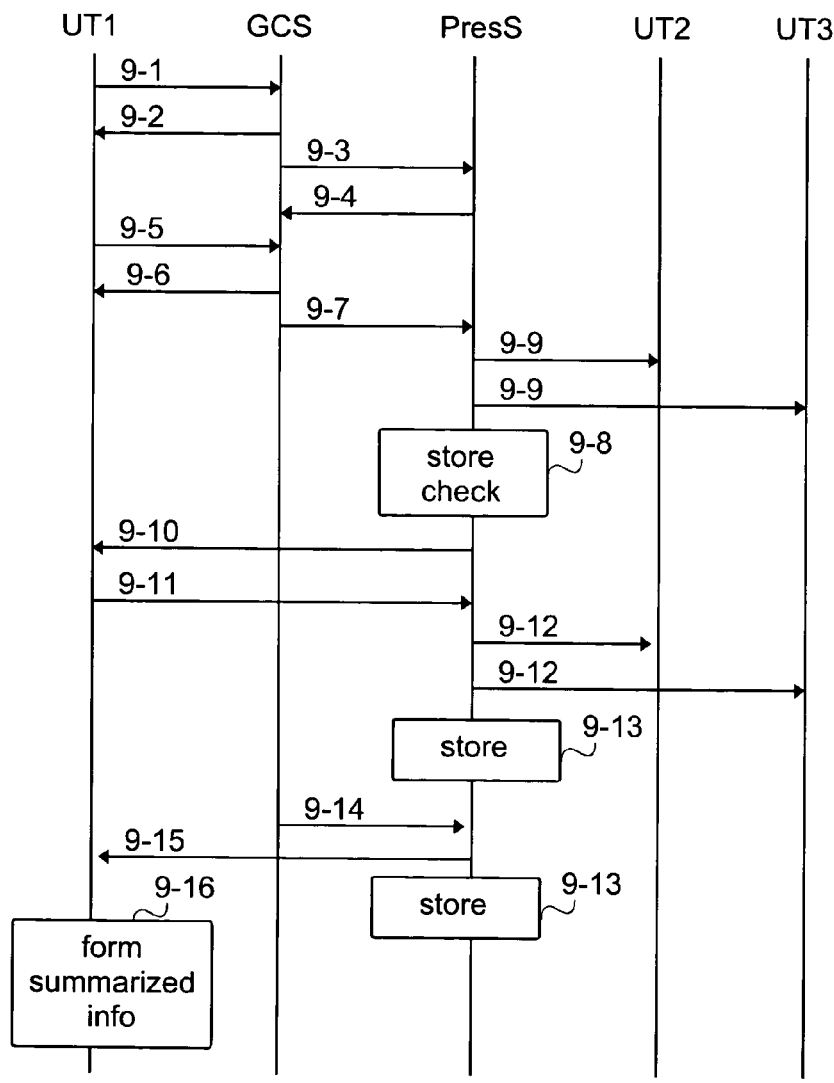

FIG. 9 starts at the moment when the UT1 wants to start to use group communication service. Therefore, the UT1 sends message 9-1 to the GCS in order to authenticate itself to the GCS. The authentication succeeds and the GCS acknowledges the authentication by sending message 9-2.

In response to the authentication, the GCS authenticates the UT1 for the presence service by sending message 9-3. The authentication of the UT1 succeeds and the PresS sends message 9-4 to the GCS acknowledging message 9-3. The GCS may be configured to perform the authentication for all UTs or for instance only to those who have some special information in their GCS authentication data.

Then the UT1 wants to attach to group A and sends message 9-5 (corresponding to message 5-3 in FIG. 5) to the GCS, which acknowledges in message 9-6 that the UT1 has joined the group.

The GCS is configured, in response to the reception of message 9-6, to authorize the presence information on the UT1 to the other members of group A by sending an authorization message 9-7 to the PresS. The content of the authorization message 9-7 corresponds to that of message 5-10 in FIG. 5 except that message 9-7 also comprises the URL of the group. The values for the PoC presence attributes are preferably determined in the GCS group member-specifically.

The PresS is configured, in response to receiving message 9-7, to notify the members in message 9-7 by sending each of them message 9-9. Message 9-9 also contains information that the UT1 has authorized its presence information for group A. On the basis of the information, those devices to whom message 9-9 is sent recognize that the UT1 is a member of group A and can update their group information. Then, in point 9-8, the PresS stores to its memory that the UT1 has authorized members in message 9-7 to receive the presence information. After that the PresS checks, in point 9-8, whether it has the presence information on the UT1.

If the PresS does not have the presence information on the UT1, as is the case in this example, the PresS requests the presence information from the UT1 in message 9-10 and receives the current presence information from the UT1 in message 9-11. In response to message 9-11, the PresS delivers the presence information on the UT1 to the other members of the group in message 9-12.

If the PresS has the presence information on the UT1, it further checks in point 9-8, whether it has already delivered the presence information on the UT1 to the other members of group A, indicated in message 9-7, and message 9-12 is sent only to those members to whom it has not already been delivered.

After sending messages 9-12, the PresS stores, in point 9-13, information on to whom the presence information on the UT1 has been delivered, i.e. to whom it sent message 9-12.

The GCS is also configured, in response to the reception of message 9-5, to subscribe to the presence information on the other members of group A to the UT1 by sending message 9-14 to the PresS. The content of the subscription message 9-14 corresponds to that of message 5-13 in FIG. 5, except that message 9-14 comprises URLs of all other members of group A who fulfill conditions laid down in the PoC presence subscription and the URL for the group. The values for the PoC presence subscription are determined preferably in the GCS group member-specifically.

In response to message 9-14, in message 9-15 the PresS delivers presence information on those members whose URL were in message 9-14, necessitating that they have authorized the UT1 to receive their presence information. Message 9-15 also comprises the URL of group A indicating that members in message 9-14 belong to group A. If a group member has not authorized the UT1 to receive his presence information or the presence information on a group member has already been delivered to the UT1, the message 9-15 contains only the URL of such a member. Thus, the UT1 receives information on the other members of group A.

Then the UT1 forms, in point 9-16 (corresponding point 5-16 in FIG. 5), the summarized group member information on group A on the basis of the received presence information on the other group members.

In another embodiment of the invention, the UT1 is configured to check, in response to joining a group, whether it has already pushed its presence information to the PresS.

In another embodiment of the invention, the UT1 is configured to request the member list of group A from the GCS, and messages 9-9 and 9-15 do not contain the URL of group A.

When presence information on a group member is changed, the summarized group member information is updated according to FIG. 7.

When the UT1 attaches to another group, e.g. group B, and its PoC presence subscription was the "latest active group only", the GCS checks which members of group A are not in group B, and unsubscribes to the presence information on such members by sending a message to the PresS, the message indicating such group members. Then the GCS unauthorizes presence information on the UT1 for such members by sending a message to the PresS, the message indicating such group members. In response to the latter message, the PresS would notify those group members. In the above example, the UT1 would unsubscribe to presence information on the UT3 and unauthorize the UT3 to receive presence information of the UT1.

Figure 10:
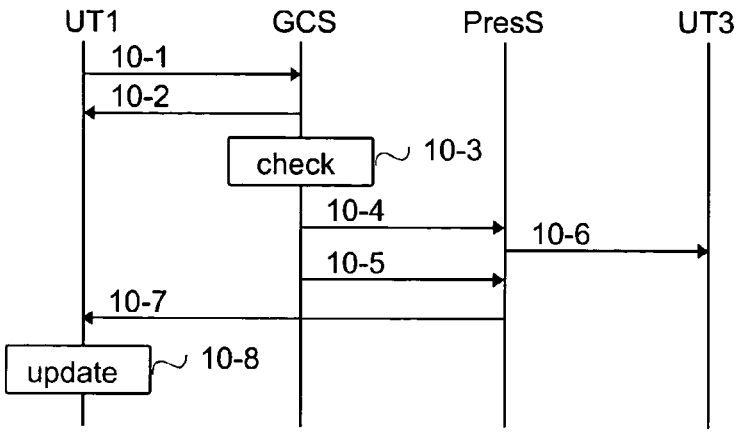

FIG. 10 illustrates signaling in a situation when the UT1 is attached to groups A and B and wants to detach itself from (leave) group A. Therefore, the UT1 sends message 10-1 to the GCS, message 10-1 indicating that the UT1 leaves group A. The GCS sends an acknowledgement to the UT1 in message 10-2. Then the GCS updates, in point 10-3, its information on the UT1 and group A and checks, whether there are any members in group A who are not members of any other group the UT1 belongs to. In this example such a member is the UT3. Therefore the GCS unauthorizes, on behalf of the UT1, presence information on the UT1 from the UT3 by sending message 10-4 to the PresS and unsubscribes, on behalf of the UT1, to the presence information on the UT3 by sending message 10-5. In response to message 10-4, the PresS sends message 10-6 to the UT3. Message 10-6 informs the UT3 that the presence information on the UT1 is to be "nulled". In response to message 10-5, the PresS sends message 10-7 to the UT1. Message 10-7 informs the UT1, that the presence information on the UT3 (i.e. those members who are listed in message 10-5) is to be "nulled".

In response to either message 10-2 or message 10-7, the UT1 updates, in point 10-8, its summarized group information on group A either by deleting group A from the group-enhanced phone book or by updating the summarized group information on group A to show that the UT1 is not attached to the group, for example. In response to message 10-7, the UT1 also deletes the presence information on those members who are indicated in message 10-7, i.e. in this example the presence information on the UT3.

Third Exemplary Embodiment

In the third exemplary embodiment it is assumed that the presence server is configured to maintain group information comprising at least the URL of the group and information on at least active group members. A further assumption is that the presence information is authorized and subscribed to group-specifically. In the following example it is assumed that a user of the system forms the group. However, it is obvious to one skilled in the art that the embodiment can also be applied to examples where some other instance, such as for instance a system manager, forms the group and transfers the group information to the PresS.

Figure 11:
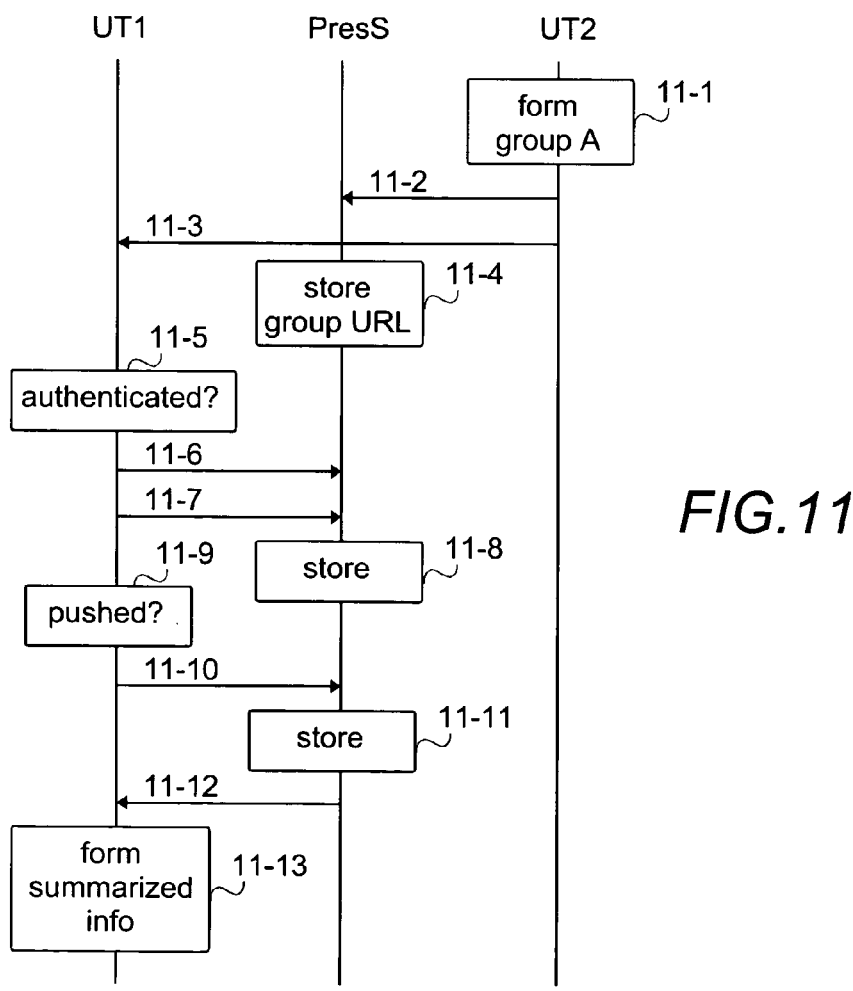

FIG. 11 illustrates a situation in which the UT2 forms group A in point 11-1 and sends a URL of group A to the PresS in message 11-2. Then the UT2 advertises the group to other (possible) members of the group A by sending a short message 11-3 to them, for example. The short message 11-3 contains the URL of group A.

In response to receiving message 11-2, the PresS stores the URL of group A in point 11-4. If group A is a predefined group and message 11-2 also contains a member list of group A, the PresS also stores, in point 11-4, the member list of group A.

The UT1 wants to join group A and therefore checks, in point 11-5, whether it has already authenticated itself with the PresS. If not, then the authentication is performed subsequently. However, in this example it is assumed that the UT1 has already authenticated itself, and therefore the UT1 sends the PresS message 11-6 comprising the URL of group A and indicating that the UT1 wants to join group A. Then the UT1 sends message 11-7 authorizing its presence information to all members of group A. The content of message 11-7 corresponds to the content of message 5-10 in FIG. 5, but the attribute values are given group-specifically, preferably without any information on the other group members.

In response to receiving message 11-7, in point 11-8, the PresS stores to the group information on group A that the UT1 has authorized group A to receive presence information on the UT1. Then the PresS notifies those devices which have subscribed to the presence information on group A, that the UT1 has joined the group. This signaling is, however, not illustrated in FIG. 11.

Then the UT1 checks, in point 11-9, whether it has already pushed its current presence information to the PresS. If not, then the UT1 pushes its presence information to the PresS. In this example, it is assumed that the UT1 has already pushed its current presence information to the PresS.

The PresS will, either in response to message 11-7 or after receiving the presence information on the UT1, deliver it to those members the PresS sent the notification and to whom the presence information has not yet been delivered.

After that the UT1 sends message 11-10 subscribing to the presence information on group A. In other words, message 11-10 contains the URL of the group A instead of the URLs of the other members. Otherwise the content of message 11-10 corresponds to the content of message 5-13 in FIG. 5. In response to receiving message 11-10, the PresS stores, in point 11-11, in group A information that the UT1 has subscribed to the presence information on group A and the delivers, in message 11-12, presence information on those members of group A who have authorized the members of group A to receive their presence information and whose information has not yet been delivered to the UT1.

In response to receiving the information in message 11-12, the UT1 forms, in point 11-13 (corresponding to point 5-16 in FIG. 5), the summarized group member information on group A on the basis of received presence information on other group members.

If the UT1 after that joins group B and if the presence subscription (in message 11-10) was the "latest active group only", the UT1 unsubscribes to the presence information on group A by sending a message to the PresS. Then the UT1 unauthorizes its presence information for members of group A by sending a message to the PresS. In response to these messages, the PresS updates its group information and notifies the other group members.

When the PresS receives an update of presence information on a UT, it checks its group information to find out to which groups the UT belongs and delivers the current presence information on the UT to the members of those groups according their subscription parameters (given in message 11-10). Preferably the PresS is arranged to deliver the information only once regardless of to how many same groups the UT and the receiver of the current presence information on the UT belongs. In response to receiving current presence information from the PresS, the UT1 is arranged to update the summarized group member information as described earlier with other embodiments of the invention.

When the UT1 wants to detach itself from (leave) the group A, the UT1 sends the PresS a message indicating that the UT1 leaves group A. Then the UT1 unauthorizes its presence information from group A by sending a message to the PresS and unsubscribes to the presence information on group A by sending another message to the PresS. Then the UT1 updates its summarized group information on group A as described earlier with other embodiments of the invention. The PresS updates its group information according to the received messages, notifies, if necessary, the other members of the group and checks to which members a message corresponding to message 8-6 in FIG. 8 should be sent and if such members exist (including the UT1 itself), the PresS sends the message, also to the UT1.

Fourth Exemplary Embodiment

Figure 12:
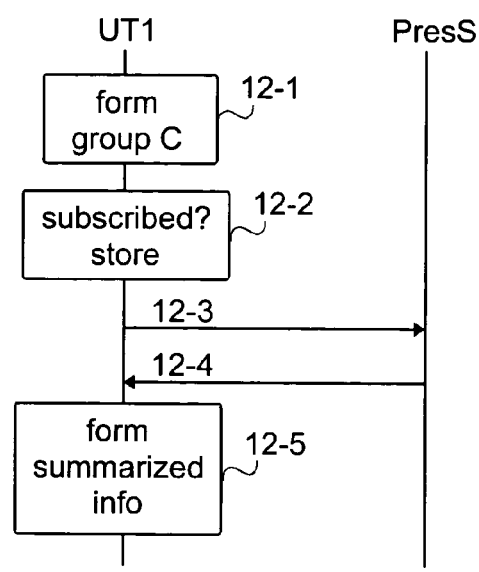

In the fourth exemplary embodiment of the invention it is assumed, like in the first preferred embodiment, that the presence server has no information on a group. Thus, the group presence information is subscribed to from the presence server as individual presence information. Furthermore, it is assumed that a group creation and membership management are handled at user level without interacting with the system and that the UT1 forms an individual group, i.e. a group which is targeted to show summarized information on individuals the user is interested in, the individuals not knowing that the UT1 has such a group. In FIG. 12 it is also assumed that the UT1 has already authorized itself to the PresS.

FIG. 12 is a signaling chart illustrating a situation when the UT1 wants to create an individual group C. Therefore, the UT1 forms, in point 12-1, group C by selecting UT2 and UT5 to be the other members of the group and giving the group an identifier, which can be the name of the group, since individual groups do not typically need an URL because they are not intended to be used for group communication. The other members need not be PoC members, since the network side does not maintain any group information on group C.

In order to obtain summarized group member information on group C, the UT1 according to this exemplary embodiment of the invention is configured to check member-specifically, in point 12-2 (corresponding to point 5-12 in FIG. 5), whether it has already subscribed to presence information on the member in question, subscribes to the PoC presence information by sending message 12-3 (corresponding to message 5-13 in FIG. 5) and stores information on members whose presence information was subscribed to in message 12-3. This time the UT1 finds out that it has already subscribed to the presence information on the UT2, but not that on the UT5. Therefore, the UT1 subscribes to the presence information on the UT5 in message 12-3.

In response to message 12-3, the PresS delivers, in message 12-4, presence information on those URLs which were in message 12-3, necessitating that they have authorized the UT1 to receive their presence information. If the UT5 authorizes the UT1 to obtain the presence information on the UT5 after this subscription, the PresS will push the presence information on the UT5 to the UT1 after the authorization. In this example, it is assumed that the UT5 has authorized the UT1 to receive its presence information.

However, the UT1 may be configured to request the other members to authorize their presence information to the UT1 either before sending message 12-3 or after receiving message 12-4, preferably in response to not obtaining the requested presence information. The PresS may also or alternatively be configured to notify, in response to message 12-3, those URLs (i.e. UTs) which have not authorized the UT1 to receive presence information that the UT1 wants to subscribe their presence information.

Then the UT1 forms, in point 12-5, the summarized group member information on group C on the basis of the received and earlier received presence information on the other group members. In other words, in this example, group C is added to the group-enhanced phonebook with summarized group member information. For example, the summarized group member information could indicate the members of group C with status information. In other words, in this example, group C is added to the group-enhanced phonebook indicating that other members of group C are the UT2 having an ongoing call and the UT5 not having an ongoing call, for example.

The signaling illustrated in FIG. 12 may also be used in communications system not having a separate group service network node, such as the GCS.

Naturally, if the UT1 has not authenticated itself to the PresS, it has to perform the authentication at the latest before sending message 12-3.

The points and signaling messages shown in FIGS. 2 to 12 are not in absolute chronological order and some of the points may be performed simultaneously or differing from the given order. Other functions can also be executed between the points or within the points. Some of the points can also be left out. The signaling messages are only exemplary and may even comprise several separate messages for transmitting the same information. In addition, the messages can also contain other information. The messages can also be freely combined or divided into several parts. Depending on the network structure, other network nodes, between which different functions have been divided, may participate in data transmission and signaling.

The above-described functionality may be triggered by the user simply indicating that he wants to attach himself to (or detach himself from) a group, whereby the other messages are sent and the points performed without any further instructions from the user.

Although in the above the invention has been described by embodiments, where the UT forms the summarized group member information, it is obvious to one skilled in the art how to implement the invention if the summarized group member information or part of it is formed by a server component, such as the GCS or the PresS, or some other network node and the summarized group member information or part of it is sent to the UT. In these embodiments of the invention, some parts of the functions described above with the UT are performed in the system or both in the system and in the UT. For example, the server component may calculate the total number of group members as summarized group information and the UT the total number of active group members. In these embodiments the UT may be configured to request for a group summary and/or group definitions for the UT, maintained in the system, may indicate that the UT has subscribed to a group summary. The indication may even define the content of the group summary and/or on which members the summary has been formed.

A system and/or a device and/or a network node implementing the functionality according to an embodiment of the present invention comprises not only means required for providing information service on other users according to prior art, but also means for forming summarized group member information. In addition, the system and/or the device and/or a server component may comprise means for providing group communication service adapted to subscribe to information on group members, and authorize the information on the device to other group members in response to the device attaching itself to the group. No hardware changes are required in the structure of the system and/or the device and/or a network node. They comprise processors and memory that can be utilized in the functions of the invention. All changes required for implementing the invention can be made as additional or updated software routines and/or by adding application-specific integrated circuit(s) (ASIC).

The embodiments or parts of the embodiments described above may be freely combined in order to create new embodiments of the invention.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
subscribing to, by a user who is a group member of a talk group, information on other group members in a non-trunk communication system;
summarizing information on the group at least based on current information on at least one other group member whose information was subscribed to, the outcome being summarized group member information comprising a number of group members, a number of participating group members, numbers of participating and non-participating group members, indication of participating and non-participating group members and the number of available persons via a group; and
delivering the summarized group member information to the user,
wherein the summarized group member information comprises names of group members who are in a group call and, if no talk group call is currently active, then the summarized group member information comprises a listing of names available for a talk group call.

2. The method according to claim 1, further comprising:
receiving a subscription request from the user that the user wants to join the group;
performing the subscribing, summarizing and delivering in response to receiving the indication; and
authorizing information on the user to the at least one other member of the group in response to receiving the indication.

3. The method according to claim 2, wherein authorizing is performed group-specifically.

4. The method according to claim 1, further comprising:
detecting a change in information on a member in the group;
delivering the changed information as current information to members of the group subscribed to the information; and
updating the summarized group member information.

5. The method according to claim 2, wherein the subscribing is performed group-specifically.

6. The method according to claim 1, further comprising:
using a first color for group members who are currently active and using a second color, different from the first color, for group members who are not active.

7. The method according to claim 1, further comprising:
basing the summarized group member information on a subset of group members.

8. the method according to claim 7, wherein the subset is selected by at least one of selection by the user, selection based on a common criteria, selection based on information related to other members of the group to whom the user is subscribed, and selection by level-specificity.

9. A device in a non-trunk communication system, comprising:
a receiving unit configured to receive group information; a receiving unit configured to receive information on group members in the non-trunk communication system;
a forming unit configured to form summarized talk group member information on a the group at least based on received current information on the group members, the summarized group member information comprising a number of group members, a number of participating group members, numbers of participating and non-participating group members, indication of participating and non-participating group members and the number of available persons via a group; and a user interface for showing the summarized group member information to a user of the device, wherein the summarized group member information comprises names of group members who are in a group call and, if no talk group call is currently active, then the summarized group member information comprises a listing of names available for a talk group call.

10. The device according to claim 9, further comprising:
a subscribing and unsubscribing unit configured to subscribe and unsubscribe to information on other group members, the subscribing and unsubscribing unit being responsive to user selections.

11. The device according to claim 9, further comprising:
an authorizing and unauthorizing unit configured to authorize and unauthorize other group members to receive information on a group member using the device, the authorizing and unauthorizing unit being responsive to user selections.

12. The device according to claim 9, wherein said receiving unit said forming unit are included in a group-enhanced phonebook of the device.

13. The device according to claim 9, wherein the device is configured to subscribe to information on other group members based on information in a phonebook of the apparatus.

14. The device according to claim 9, wherein the device is configured to authorize other group members based on information in a phonebook of the apparatus.

* * * * *